United States Patent
Mastie et al.

(10) Patent No.: US 6,418,456 B1
(45) Date of Patent: Jul. 9, 2002

(54) CLEAN-UP OF FILES IN A NETWORK SYSTEM

(75) Inventors: Scott David Mastie, Longmont; Hongliang Tong, Boulder, both of CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/198,652

(22) Filed: Nov. 24, 1998

(51) Int. Cl.⁷ .............................................. G06F 12/00
(52) U.S. Cl. ...................................... 707/203; 707/206
(58) Field of Search ................................ 707/203, 206, 707/10; 358/1.1, 1.15, 1.13

(56) References Cited

U.S. PATENT DOCUMENTS

| | | | | |
|---|---|---|---|---|
| 3,593,314 A | * | 7/1971 | Moll ............................. | 711/4 |
| 3,889,237 A | * | 6/1975 | Alferness et al. ........... | 711/148 |
| 4,007,450 A | * | 2/1977 | Haibt et al. ................. | 709/226 |
| 4,432,057 A | * | 2/1984 | Daniell et al. ................ | 707/8 |
| 4,562,539 A | * | 12/1985 | Vince ........................ | 709/214 |
| 4,620,276 A | * | 10/1986 | Daniell et al. .............. | 709/201 |
| 4,714,992 A | * | 12/1987 | Gladney et al. ............ | 707/206 |
| 4,714,996 A | * | 12/1987 | Gladney et al. ............ | 707/203 |
| 4,897,781 A | * | 1/1990 | Chang et al. ................ | 707/201 |
| 5,043,876 A | * | 8/1991 | Terry ........................ | 707/201 |
| 5,136,707 A | * | 8/1992 | Block et al. ................. | 707/201 |
| 5,434,994 A | * | 7/1995 | Shaheen et al. ............ | 709/223 |
| 5,574,906 A | * | 11/1996 | Morris .......................... | 707/1 |
| 5,634,052 A | * | 5/1997 | Morris .......................... | 707/1 |
| 5,734,902 A | * | 3/1998 | Atkins et al. ................ | 709/316 |
| 5,758,342 A | * | 5/1998 | Gregerson ................... | 707/10 |
| 5,781,908 A | * | 7/1998 | Williams et al. ............ | 707/104 |
| 5,819,299 A | * | 10/1998 | Bejar ......................... | 707/206 |
| 5,991,779 A | * | 11/1999 | Bejar ......................... | 707/206 |
| 5,995,723 A | * | 11/1999 | Sperry et al. .............. | 358/1.15 |
| 5,999,945 A | * | 12/1999 | Lahey et al. ................ | 707/200 |
| 6,018,747 A | * | 1/2000 | Burns et al. ................. | 707/203 |
| 6,052,198 A | * | 4/2000 | Neuhard et al. ........... | 358/1.15 |
| 6,145,031 A | * | 11/2000 | Mastie et al. ................. | 710/52 |
| 6,233,589 B1 | * | 5/2001 | Balcha et al. ............... | 707/203 |

* cited by examiner

Primary Examiner—Jean R. Homere
Assistant Examiner—Luke S Wassum
(74) Attorney, Agent, or Firm—David W. Victor; Konrad Raynes Victor & Mann (57) ABSTRACT

Disclosed is a system and method for managing files in a network system and, in particular, a network printing system. A processing unit, such as a printer manager detects an update to a file, such as a print file, maintained in a storage unit. At least one network device, such as a printer controller, maintains a copy of the file to update that is a previous version of the file to update maintained at the storage unit. The processing unit processes a data structure indicating network devices that include previous versions of the file and determines the network devices that include at least one previous version of the file. The processing unit then transmits a message to the network devices that include at least one previous version of the file to delete the previous versions of the file.

36 Claims, 6 Drawing Sheets

| Record | Field 1 | Field 2 | Field 3 |
|---|---|---|---|
| Print Job 1 | Page 1 | Picture A | Page 2 |
| Print Job 2 | Page 1 | Page 2 | Page 3 |
| Print Job AA | Page 1 | Page 2 | Picture B |

| Record | Field 1 | Field 2 | Field 3 |
|---|---|---|---|
| Print Job 1 | Page 1 | Picture A<br><br>Controller 8a;<br>Controller 8c | Page 2<br><br>Controller 8a<br>(RIPping) |
| Print Job 2 | Page 1<br><br>Controller 8c | Page 2 | Page 3<br><br>Controller 8c<br>(RIPping) |
| Print Job AA | Page 1<br><br>Controller 8c<br>Printer 12b<br>(Printing); | Page 2 | Picture B<br><br>Printer 12a<br>(Printing) |

CLEAN-UP OF FILES IN A NETWORK SYSTEM

BACKGROUND OF THE INVENTION

1. Field of the Invention

The present invention relates to a method and system for removing outdated files from a network system and, in particular, removing outdated print files from a network printing system.

2. Description of the Related Art

Network printing systems generally comprise an assemblage of different printers, client computers, servers, and other components connected over a network. A print job is assembled at a client computer and transmitted over the network to a server linked to a variety of printers. The printers may have different printing capabilities. Thus, for a given submitted print job, some printers in the network may not be able to process the print job. To route print jobs through a network printing system, International Business Machines Corporation (IBM) provides Printing Systems Manager (PSM) products that provide centralized and distributed management of a network printing system. The IBM PSM systems manage the flow of print jobs and insure that a print job is routed to a printer that can handle the job.

A print job is comprised of one or more electronically-stored files and the print attributes therefor. The print attributes inform the printer how to process the files. To assemble print jobs, previous systems include software installed on the client computer that displays a graphical user interface (GUI). Using a mouse, keyboard, etc., the user selects from a menu of options displayed in the GUI the components and print attributes for a print job. The client computer, under control of the installed software, would then create an electronically-stored job ticket based on the information entered by the user or systems operator.

Job tickets typically only define the print attributes for a single file. However, a document may be comprised of multiple files, each having on or more print attributes. A file submitted to the printer often includes printer instructions in a page description language (PDL) such as POSTSCRIPT™. POSTSCRIPT is a trademark of Adobe Systems, Incorporated. The PostScript language is used by many printers and applications to provide the complex fonts, graphics, and image handling capabilities required by today's applications. The PostScript language must be interpreted by a transform process in the printer or elsewhere in the network to produce a printed image file that is ready to be printed. Print image files are in a bit-mapped image format, also known as a raster image. A raster image processor (RIP) translates PDL files to a raster image or RIP version of the file. In the desktop publishing environment, it can take several hours to transform a large PDL print file to its RIP version.

The IBM AIX® PRINT SERVICES FACILITY™/6000 (PSF/6000) software system transforms PostScript files into an Advanced Function Presentation data stream (AFP data stream) for printing on printers attached to a machine implementing the PSF/6000 software. AIX is a registered trademark of IBM and PRINT SERVICES FACILITY is a trademark of IBM. The PSF/6000 software uses the PS2AFP transform command to transform PostScript and other file formats into an AFP data stream file without submitting it immediately to the printer. The PS2AFP command runs as a daemon, which is a program that runs unattended in the background of the operating system. Daemon processes generally provide services that must be available at all times. A daemon runs continuously, looking for work to do, performing that work, and waiting for more work.

In previous systems, including those that implement the ISO DPA 10175, POSIX 1387.4 and PSIS printing standards, such as the IBM Printer Resource Manager products, print jobs are received and queued at a single point before being routed to a logical printer or printer that can handle the print job. Such a single point queue is sometimes referred to as a "spooler." Spoolers are servers that accept requests from many clients, validate job and document attributes with those of the intended print destination, provide queuing and scheduling, and then route jobs/documents to the appropriate printer. A queued print job is then transferred to a logical printer, which then routes the print job to a queue for one or more physical printers.

One problem with present network printing systems is that print job files are typically resent from a printer manager to a downstream component for printing each time the print job is submitted. In network systems with numerous multiple printers and servers, network traffic can substantially increase and bottlenecks can form if large files or print jobs are continually resent through the system whenever the print job is submitted. There is, thus, a need in the art for an improved method and system for handling large print jobs or files in a network system.

SUMMARY OF THE PREFERRED EMBODIMENTS

To overcome the limitations in the prior art described above, preferred embodiments disclose a system and method for managing files in a network system. A processing unit detects an update to a file maintained in a storage unit. At least one network device maintains a copy of the file to update that is a previous version of the file to update maintained at the storage unit. The processing unit processes a data structure indicating network devices that include previous versions of the file and determines the network devices that include at least one previous version of the file. The processing unit then transmits a message to the network devices that include at least one previous version of the file to delete the previous versions of the file.

In further embodiments the file to update is a print file and the print file is a component of a print job. The network devices include printer controllers to process the print file. The data structure indicating network devices that include previous versions of the print file is a first data structure. Further, the processing unit, when determining the network devices that include the previous versions of the print file, processes a second data structure indicating print jobs and the component print files of the print jobs to determine print jobs including the previous version of the print file.

In current network printing systems, print files are often not maintained at distributed network devices, such as controllers and printers, to allow for reuse of the print files. Reuse reduces network traffic because the same print job does not have to be repeatedly transmitted from a central repository to a controller or printer. With reuse, a copy of the print job may be maintained at distributed controllers or printers, thereby obviating the need to continually provide the controller or printer with a copy of the file to RIP or print. However, if multiple copies of a file are maintained throughout the network, the updating of the file at a central repository location would outdate the other copies of the files distributed throughout the network system. Preferred embodiments provide a system and method for insuring that outdated files are not maintained at distributed network devices, such as printers or controllers. With preferred embodiments, after an update to a file is made, the outdated copies of the file are removed from the network devices that maintain such copy. This insures that outdated versions of the file will not be processed, printed or otherwise used in the network system. Moreover, with preferred embodiments, any request to process a file within the network system that is the subject of a clean-up request is not executed or is otherwise suspended until outdated versions of that file have been removed (cleaned) from devices within the network system.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Hardware and Software Environment

Figure 1:
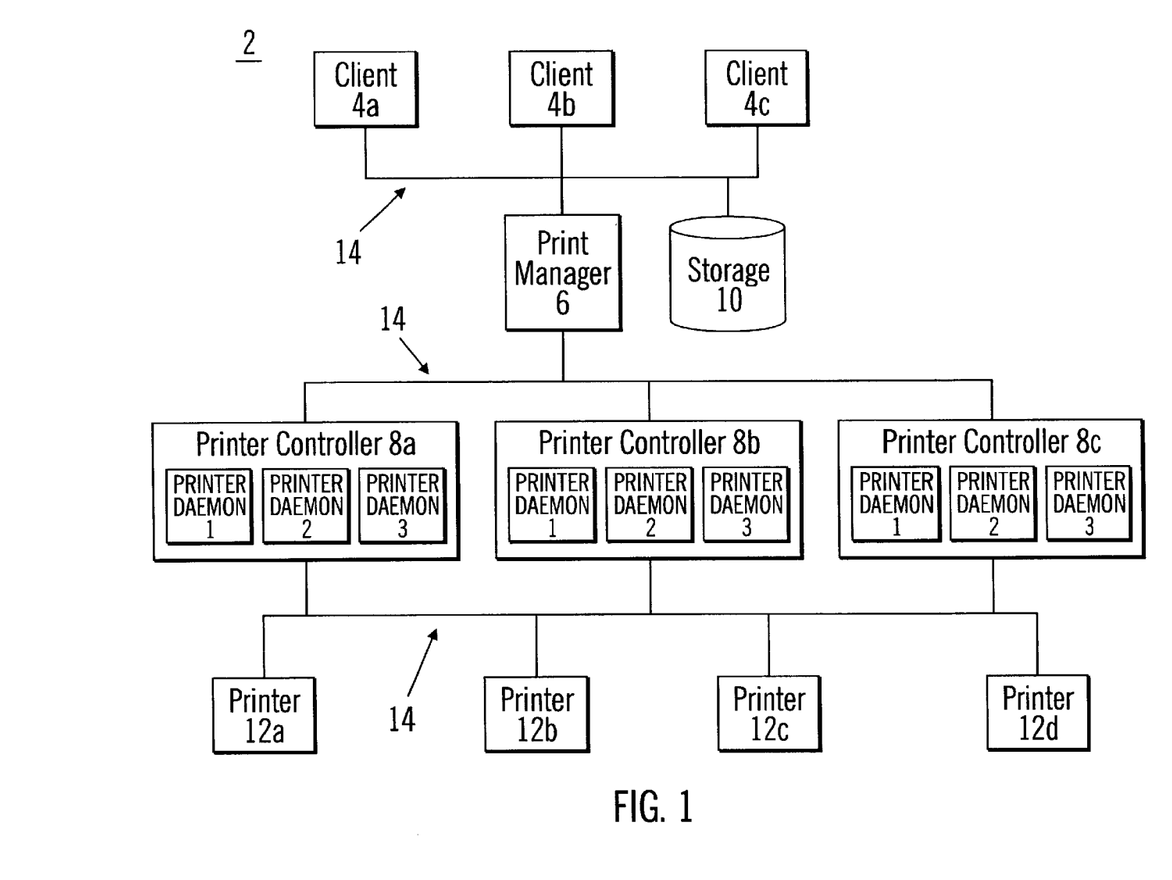
FIG. 1 is a block diagram illustrating a software and hardware environment in which preferred embodiments of the present invention are implemented.

FIG. 1 illustrates a preferred hardware and software environment in which preferred embodiments of the present invention are implemented. A network printing system 2 is comprised of a plurality of client computers 4a, b, c connected to a printer manager 6, which routes print jobs received from the clients 4a, b, c to one of a plurality of printer controllers 8a, b, c. The clients 4a, b, c and the printer manager 6 may access a storage device 10 which may store various printer related files. The printer controllers 8a, b, c are each capable of executing multiple instances of printer daemons PD1, PD2, PD3. Each printer daemon (PD) can transform an input data file to a format that may be processed by the printer. For instance, if the print job was a PostScript file, then the printer daemon (PD) would transform the PostScript file to a RIP image file. The IBM PS2AFP daemon program performs such a transformation. The printer daemons (PD) executing in multiple printer controllers 8a, b, c may be capable of simultaneously transforming different types of input data streams, e.g., PostScript, ditroff, PCL™, TeX, etc. PCL is a trademark of the Hewlett-Packard Company. The printer daemons in the controllers 8a, b, c then transfer the processed data file to one of several printers 12a, b, c, d through a back-end program that selects the printer. The printers 12a, b, c, d may be any suitable printer machine known in the art, such as the IBM INFOPRINT™ series of printers. INFOPRINT is a trademark of IBM.

A network system 14 links the clients 4a, b, c to the printer manager 6 and storage device 10, the printer manager 6 to the printer controllers 8a, b, c, and the printer controllers 8a, b, c, to the printers 12a, b, c, d. The network 14 may be comprised of any suitable network architecture known in the art, such as LAN, Ethernet, WAN, System Area Network (SAN), Token Ring, LocalTalk, TCP/IP, the Internet, etc. Alternatively, there may be separate and different networks between the clients 4a, b, c, and the printer manager 6, and the printer controllers 8a, b, c and the printers 12a, b, c, d. In preferred embodiments, the network printing system 2 employs a distributed file system (DFS), which allows storage and retrieval of data throughout the network printing system 2.

The printer manager 6 may be a separate stand alone server including an operating system such as AIX®, OS/390™, UNIX®, OS/2®, MVS™, WINDOWS®, etc. AIX and OS/2 are registered trademarks of IBM and OS/390 and MVS are trademarks of IBM; WINDOWS is a registered trademark of Microsoft Corporation; UNIX is a registered trademark licensed by the X/Open Company LTD. The clients 4a, b, c may be any computer system known in the art including software to submit print jobs to the printer manager 6. The storage device 10 may be any suitable non-volatile storage device, such as a direct access storage device (DASD), automated tape library (ATL), holographic units, etc., capable of storing print files. The clients 4a, b, c may build print jobs that include print files, such as PostScript files, maintained in the storage device 10. The printer controllers 8a, b, c may be printer controllers capable of executing multiple instances of printer daemons, such as the IBM Multiple Printer Controllers (MPC) software that runs on the IBM RS/6000® server under the AIX operating system. RS/6000 is a registered trademark of IBM. The MPC software dedicates a portion of the server processor cycles to each instance of a printer daemon that transforms data to a print image. A RIP is often considered as the transform process of a PostScript file to a bit map file. The term RIP is used herein interchangeably with transform process and printer daemon (PD) to refer to any type of transform process regardless of the format of the file being transformed to a printer readable format, e.g., bitmap file. The terms RIP, RIPper, RIPped, and RIPping all refer to a particular stage or instance of a RIP transform process. As used herein the term "print job" refers to a print job that needs to be RIPped or otherwise transformed. The concurrent execution of multiple print daemons is embodied in current IBM MPC and IBM PSF/6000 software products, described in IBM publications "PSF/6000: Print Submission," document no. S544-3878-01 (Copyright IBM Corp. 1993, 1994); "PSF/6000: Print Administration," document no. S544-3817-01 (Copyright IBM Corp. 1993, 1994); "IBM Print OnDemand User Guide," document no. G544-5325-00, (Copyright IBM Corp. 1996), all of which IBM publications are incorporated herein by reference in their entirety. The printer manager 6 and printer controllers 8a, b, c would include further logic to implement the preferred embodiments of the present invention.

Each of the devices in the network 2 has a unique IP address. Moreover, each printer daemon (PD) in the printer controllers 8a, b, c may be associated with a port address. The combination of the IP address of the printer controller 8a, b, c and the port address therein provides a unique address for the printer daemon (PD). The printer manager 6 may use this unique printer daemon (PD) address to route a print job to a specific instance of one of many printer daemons executing in the printer controllers 8*a, b, c*. Methods and systems for selecting a printer daemon (PD) in one of the printer controllers 8*a, b, c* to RIP a print job are described in U.S. patent application entitled "Load Balancing for Processing a Queue of Print Jobs," by Scott D. Mastie, Hogliang Tong, Ming Xie, and Christopher B. Hirsch, filed Aug. 26, 1998, assigned Ser. No. 09/140,480, which patent application is assigned to IBM, the assignee of the present application, and which patent application is incorporated herein by reference in its entirety.

After the print job is RIPped, the printer manager 6 maintains a queue and selects a RIPped job from the queue to then transfer to a printer 12*a, b, c, d* in the printing system 2. Methods for queuing RIPped print jobs are described in U.S. patent application entitled "Multiple Insertion Point Queue to Order and Select Elements to be Processed," by Scott D. Mastie and Ming Xie, filed Aug. 26, 1998, assigned Ser. No. 09/140,482, which patent application is assigned to IBM, the assignee of the present application, and which patent application is incorporated herein by reference in its entirety. The printer manager 6 maintains the queue across all printers 12*a, b, c, d* and printer controllers 8*a, b, c* regardless of where the RIPped print job resides. In preferred embodiments, the queue the printer manager 6 maintains may not include the actual RIPped files. Instead, the queue may maintain pointers to the RIPped files or a token representing the RIPped files that are part of the print job, whether those RIPped files are in one of the printer controllers 8*a, b, c* or in a library of RIPped files in the storage device 10.

The printer manager 6 may route a print job to a logical printer queue within one of the controllers 8*a, b, c* according to a rule based criterion, such as the rule based criteria described in U.S. patent application entitled "Rule Based Selection Criteria for Controlling Print Job Distribution," by Scott D. Mastie and Ming Xie, filed Aug. 26, 1998, assigned Serial No. 09/140,613, which patent application is assigned to IBM, the assignee of the present application, and which patent application is incorporated herein by reference in its entirety.

Print Job Data Structures

In preferred embodiments, the printer manager 6 maintains a database, table or other data structure type that indicates the component pages of a print job, referred to herein as a print job table. In preferred embodiments, the printer manager 6 would include a database application program, such as the IBM DB2, that creates a record or object file for each print job that has as fields the component files of the print jobs. The component fields of the print job record may provide information on each page of the print job. Preferred embodiments may utilize the Advanced Function Presentation Conversion and Indexing Facility (ACIF) which indexes a print job by dividing the print job into identifiable units or groups. Each group or structured field may define one or more pages within the print job. In this way, the printer manager 6 maintains information in a database structure on the print job and all component parts thereof. Further included is information on where each component part, e.g., page, is located in the network printing system 2. The ACIF system is described in the IBM publication "Advanced Function Presentation Conversion and Indexing User's Guide," IBM document no. S544-5285-00 (IBM copyright 1993, 1996), which publication is incorporated herein by reference in its entirety.

In preferred embodiments, a copy of a print file may be maintained at a network device downstream of the printer manager 6 in the network printing system 2, such as the printer controllers 8*a, b, c* or printers 12*a, b, c, d* for reuse. (The term print file as used herein refers to any type of file containing content for a print job, including an entire print job comprised of one or more object files or a component file of a print job. The print file may in a RIPped format or a pre-RIP format.) For instance, in a print job of a multi-volume book, such as an encyclopedia, comprised of RIP files A–G, printer controller 8*a* may have RIP files A–C, printer controller 8*b* may have RIP files D, E, and printer controller 8*c* may have no RIP files for the print job. The files maintained in the printer controllers 8*a, b, c* may be reused. For instance, the printer manager 6 may route a print job to a logical printer queue within a printer controller 8*a* that has the greatest portion of that print job. Routing print jobs to printer controllers 8*a, b, c* that include a copy of the RIPped file minimizes network traffic by minimizing the need to transfer RIPped files from a common repository, e.g., storage device 10, that are already available in a printer controller 8*a, b, c* or to transfer RIPped files between printer controllers 8*a, b, c* and the printers 12*a, b, c, d*.

Figure 2A:
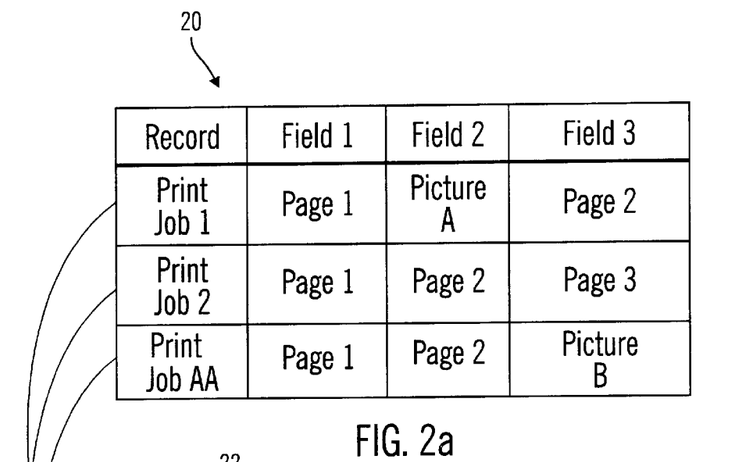
FIGS. 2a, b, c illustrate data structures that maintain information on print jobs and the distribution of print jobs in the network printing system in accordance with preferred embodiments of the present invention.

FIG. 2*a* illustrates a preferred embodiment of a print job data structure 20 maintaining information on various print jobs 1, 2, AA. Each print job record (print jobs 1, 2, AA) has fields which include information on components of the print job. Information maintained in the fields may include the component of the print job, e.g., page(s), graphical objects, etc, and the location information of the print job component in the common library storage 10.

Figure 2B:
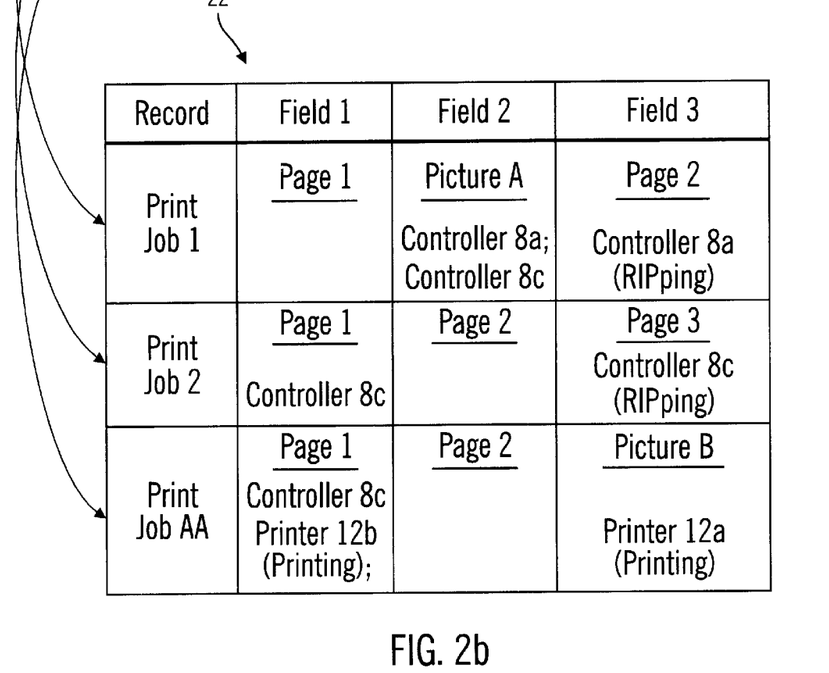

In addition to the database indicating the component pages of a print job, in preferred embodiments, the printer manager 6 may maintain a status table (or other data structure) 22 illustrated in FIG. 2*b* indicating those print jobs that have component files located at downstream network devices (e.g., the printer controllers 8*a, b, c* and printers 12*a, b, c, d*). This second data structure (table) 22 may include as records print jobs and as fields the print job components, e.g., pages, pictures, etc. In addition to indicating the component print files of the print job, the fields may also indicate the location of the print file component at a network device downstream of the printer manager 6 in the network printing system 2 and the status of the print file component as of the last time the printer manager 6 determined the status. The status may indicate that the print job component is being RIPped or is printing. If the printjob component is not RIPping or printing, then it may be stored in the printer controller 8*a, b, c* or printers 12*a, b, c, d*. The data structures 20, 22 may be implemented in a database application program known in the art, e.g., the IBM DB2 database program, or as a file data structure. Further, in both the print job 20 and table 22 data structures, different print job records may have the same print file components.

Figure 2C:
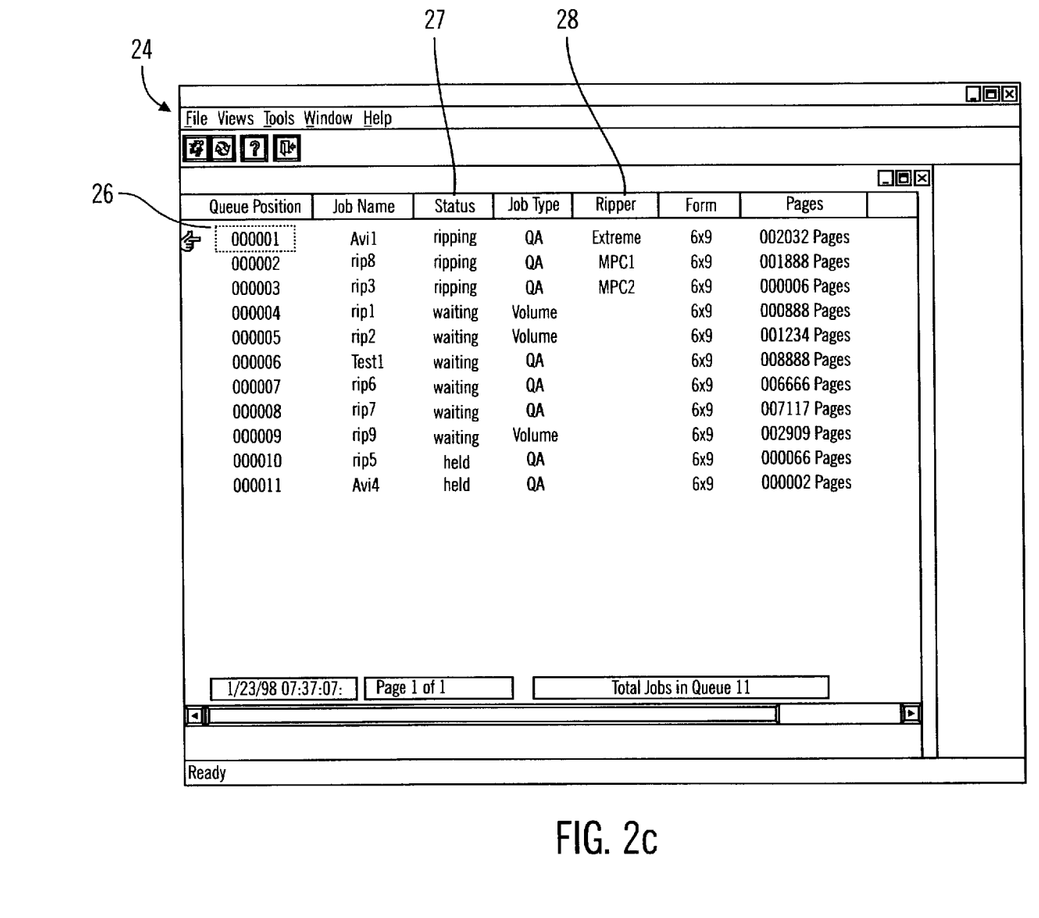

FIG. 2*c* illustrates a graphical user interface of information maintained in a status table 24. The status table 24 includes information indicating print jobs being processed. A queue position field 26 indicates the position of the print job in the queue, i.e., when the printer manager 6 received and queued the print job. A status field 27 indicates the status of the print job in the queue, i.e., whether it is waiting to be RIPped, whether it is RIPping or whether an operator has indicated to hold the print job. A RIP engine field 28 indicates the name of the RIPper, i.e., print daemon (PD), RIPping the print job. The printer manager 6 would utilize the information maintained in the status table 24 shown in FIG. 2*c* to determine the status of a print file.

In preferred embodiments, the printer manager 6 would update the fields in the status table 22 or 24 indicating downstream devices that include a copy of the print file component and the status thereof whenever the printer manager 6 initiates a RIPping or printing operation, and at any other moment the printer manager 6 executes an operation relating to the status information in the table. Further, the location information in the status table 22 indicating the downstream device that has a copy of the print file may also include file path information, such as IP address information, indicating the file path of the print file in the downstream device.

Clean-Up Operations

One problem with maintaining component files of a print job (file) distributed throughout the network printing system 2 is that if a component file or page of the print job is updated in the common library storage 10, then outdated versions of the component file may still be maintained at other locations in the network printing system 2 and be reused in subsequent print jobs. Preferred embodiments provide a clean-up mechanism to insure that no outdated versions of component files are maintained in the network printing system 2.

Figure 3A:
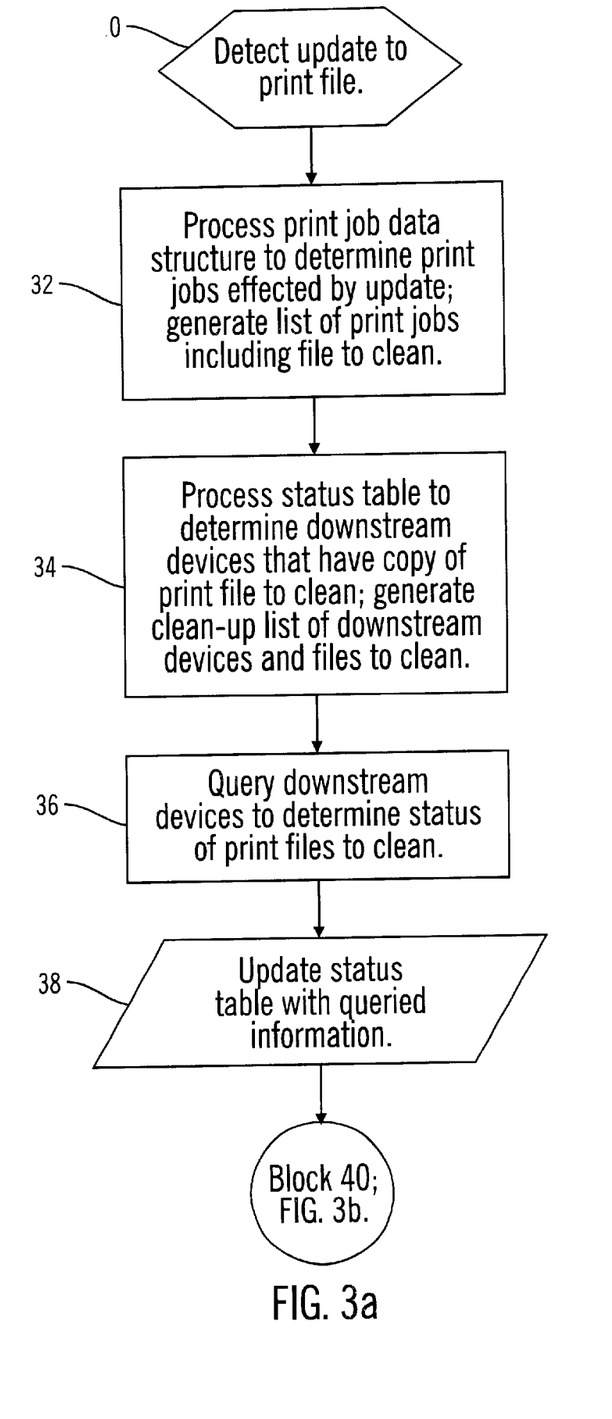
FIGS. 3a, b illustrate logic to remove outdated files from the network printing system in accordance with preferred embodiments of the present invention.
Figure 3B:
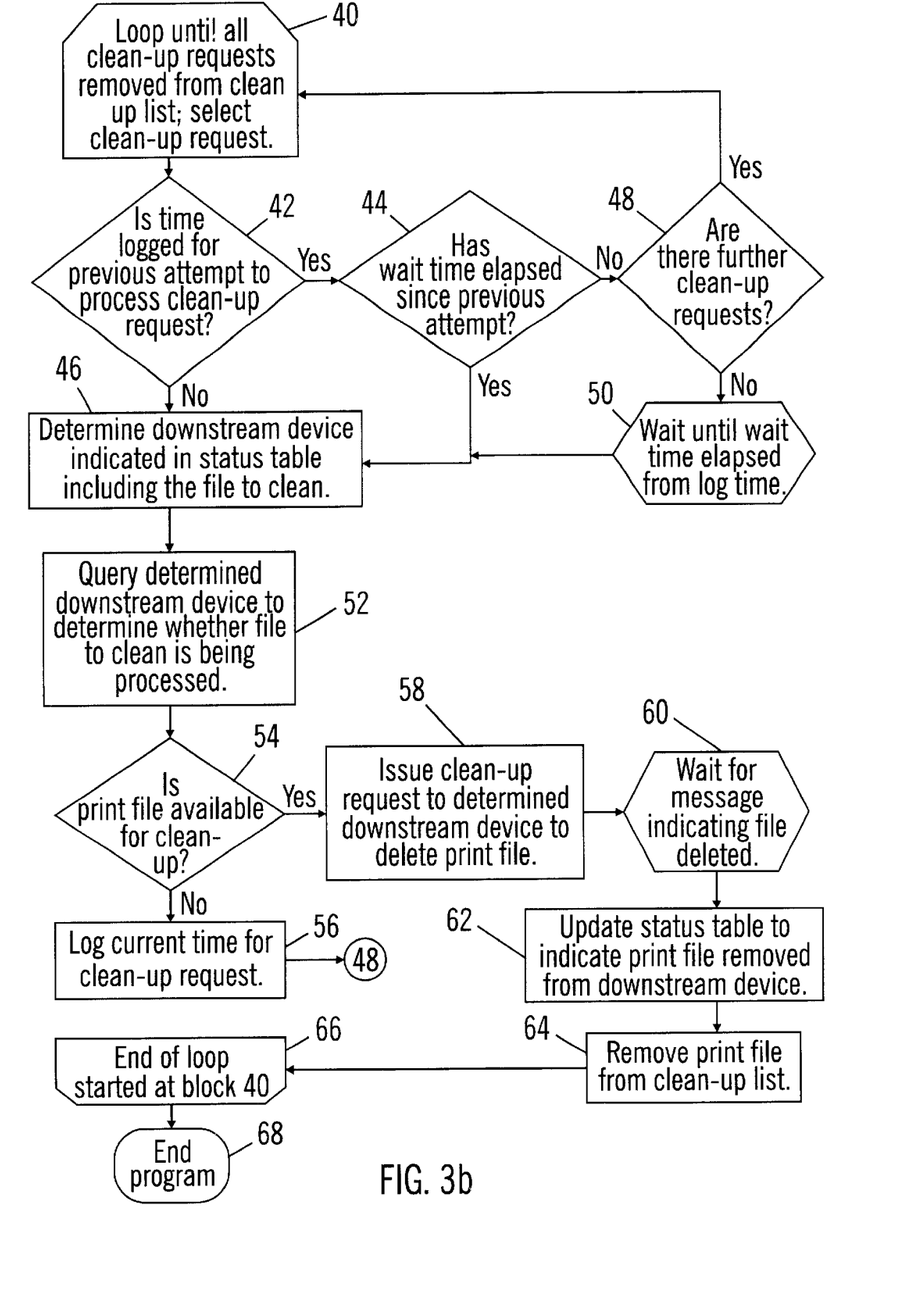

FIGS. 3*a*, *b* illustrate logic implemented in the printer manager 6 as part of an application program or the operating system to clean-up files downstream of the printer manager 6 when a print file is updated. Logic begins at block 30 where the printer manager 6 detects an update to a print file. As discussed, the storage 10 may provide a common library repository for print jobs. An update would occur by updating the print file in the common library repository or by user request. Control then transfers to block 32 where the printer manager 6 processes the print job data structure 20 to determine those print jobs that include the updated print file as a component print file, i.e., the print jobs affected by the clean-up request. This can be determined by processing the content of the fields of the print job data structure 20. Control transfers to block 34 which represents the printer manager 6 processing the status table 22 to determine those downstream devices that have a copy of the print file to clean-up. For instance, if the print file to clean is page 1, then the printer manager 6 would determine from the clean-up list that print job 1, 2, and AA include the page 1 to clean-up and determine from the status table 22 the downstream devices that include page 1 to clean, i.e., controller 8*c* and printer 12*b*. At block 34, the printer manager 6 further generates a "clean-up list" of clean-up requests comprising a particular instance of the print file to remove from a location within a particular downstream device. Thus, one print job that affects ten downstream devices, i.e., ten downstream devices include a copy of the print file to clean, can generate ten different clean-up requests or work elements in the clean-up list. Further, the presence of two copies of the print file to clean at different locations within a single downstream device would create two separate clean-up requests on the clean-up list. The clean-up list thus contains clean-up requests for each instance of the print file that must be cleaned from a downstream device.

Control then transfers to block 36 where the printer manager 6 queries the downstream devices determined at block 34 to determine whether the downstream devices indicated as including a copy of the print file to clean-up actually still maintain the print file to clean and the status of such print file, i.e., RIPping, printing, etc. Control then transfers to block 38 where the printer manager 6 updates the status table 22 with the queried information. Thus, at block 38, the status table 22 may be updated to reflect any changes that have occurred since the last time status information was updated.

Control then transfers to block 40 in FIG. 3*b* which is a loop that is continually processed until all clean-up requests are removed from the clean-up list. At block 40, the printer manager 6 selects a clean-up request from the list. In preferred embodiments, when the loop begins, the printer manager 6 would select the first entry in the clean-up list. In subsequent iterations, the printer manager 6 may select the next subsequent clean-up request. If the end of the clean-up list is reached, then the printer manager 6 may return to the beginning or front-end of the list if there are prior requests remaining on the clean-up list. Those skilled in the art will recognize that there are alternative methods for selecting a clean-up requests from the list.

From block 40, control transfers to block 42 where the printer manager 6 determines whether a time is logged indicating a time at which the clean-up request was previously processed but did not complete. If such a time is logged, control transfers to block 44; otherwise, control transfers to block 46. At block 44, the printer manager 6 determines whether a predetermined wait time has elapsed since the logged time. This "wait" time insures that the printer manager 6 will wait a predetermined period of time before retrying a clean-up request. If the wait time has elapsed, control transfers to block 46; otherwise, control transfers to block 48 where the printer manager 6 determines whether there are other clean-up requests pending on the clean-up list. If so, control transfers back to block 40 to select another clean-up request on the list to process. Otherwise, if the wait time has not elapsed, control transfers to block 50 where the printer manager 6 waits until the predetermined wait time has elapsed from the logged time. After the wait time has elapsed at block 50, control transfers to block 46 to again process the clean-up request.

At block 46, the printer manager 6 determines the downstream device including the print file that is the subject of the selected clean-up request. The printer manager 6 may determine the downstream device from the clean-up request itself which may include such information or by processing the print job data structure 20 and status table 22 to determine the downstream device including the print file to clean. Control then transfers to block 52 where the printer manager 6 queries the determined downstream device via the network 14 to determine whether the print file is available for clean-up. A print file is available for clean-up if it is not being processed, e.g., printed or RIPped. Control then transfers to block 54 which is a decision block representing the printer manager 6 proceeding to block 56 if the print file to clean-up is not available; otherwise, control transfers to block 58 if the print file to clean-up is not being processed or is otherwise available for clean-up. As discussed, print files may be stored downstream for reuse purposes.

Block 56 represents the printer manager 6 logging the current time to indicate when the clean-up request was attempted and the print file was unavailable for clean-up. From block 56, control transfers to block 48 to proceed after logging the clean-up request. If the file to clean is available for clean-up, i.e., not being processed, then at block 58 the printer manager 6 issues a clean-up command via the network 14 to the determined downstream device to delete or update the print file to clean. Control then transfers to block 60 which represents the printer manager 6 waiting for a message from the downstream device to which the clean-up command was issued indicating that the file was deleted from the downstream device. The downstream devices would thus include network logic to process and respond to clean-up commands and other network messages from the printer manager 6. After receiving the message from the downstream device indicating successful removal of the print file to clean, control transfers to block 62 which represents the printer manager 6 updating the status table 22 to remove the indication that a copy of the cleaned-up print file is maintained at such downstream device. Control transfers to block 64 to remove the clean-up request just completed from the clean-up list. From block 64, control transfers to the end of the loop at block 66. From the end of the loop, control transfers to the back to the beginning of the loop at block 40. If there are clean-up requests on the clean-up list, then a clean-up request is selected from the list, and control transfers to block 42 to execute the loop another time. However, if the clean-up list is empty at the end of the loop at block 66, then control transfers to end the program at block 68.

Thus, a "cleaned" print file means that no downstream device maintains an outdated version of the "cleaned" print file, which may be a component part of multiple print jobs.

Figure 4:
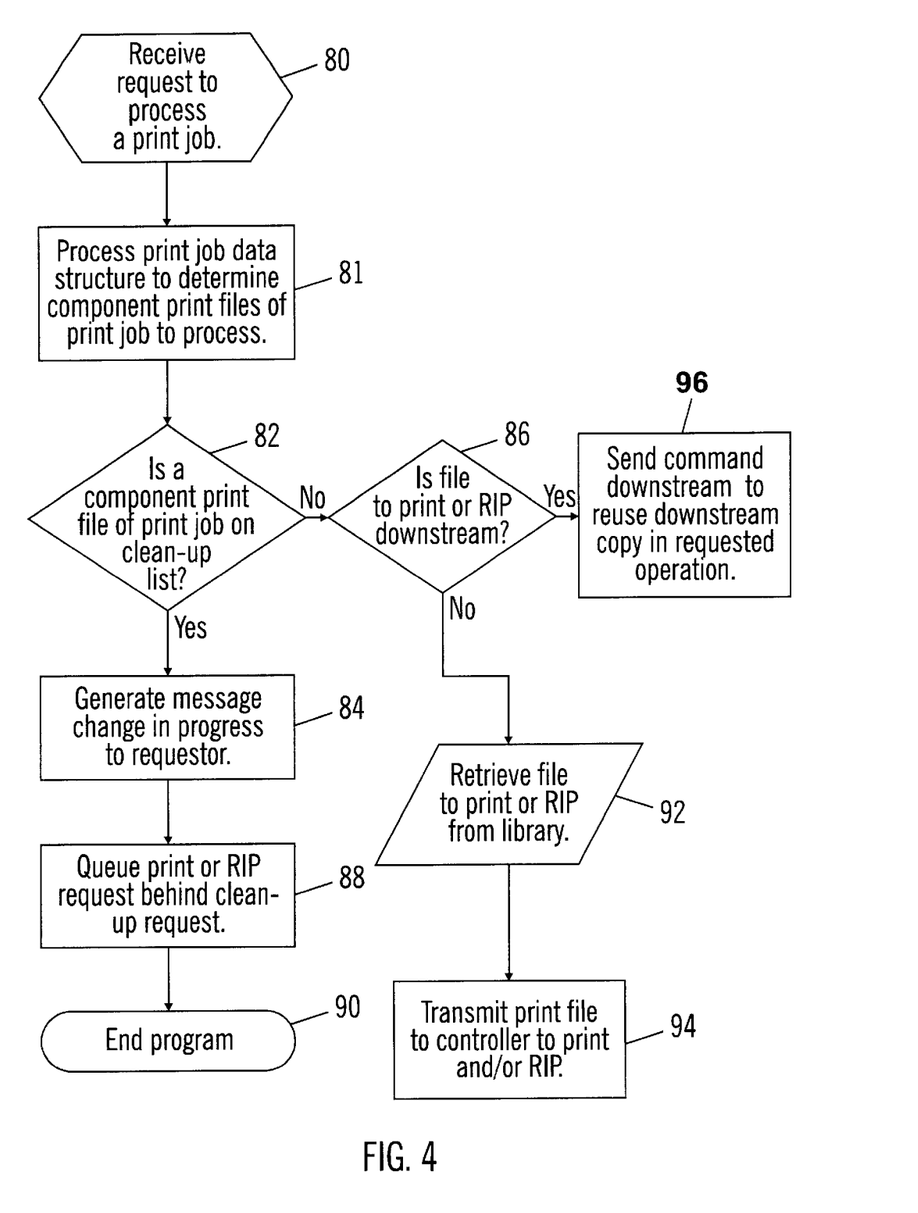
FIG. 4 illustrates logic to handle requests directed toward print jobs when outdated files of the print job are being removed from the network printing system in accordance with preferred embodiments of the present invention.

FIG. 4 illustrates logic implemented in the printer manager 6 to process a request to process, e.g., RIP or print, a print job in the network printing system 2. Control begins at block 80 which represents the printer manager 6 receiving a request to process a print job. Control transfers to block 81 where the printer manager 6 processes the print job data structure 20 to determine the component print files of the print job to process. Control then transfers to block 82 where the printer manager 6 determines whether a component file of the requested print job is on a clean-up list and, thus, in the process of being "cleaned-up." If so, control transfers to block 84; otherwise, control transfers to block 86. At block 84, the printer manager 6 generates a message to the requester, which may be one of the clients 4a, b, c, that the print job is in the process of being updated, or is otherwise unavailable. Control then transfers to block 88 where the printer manager 6 queues the print or RIP request behind any queued clean-up requests. In this way, the request toward the print job is not executed until outdated versions of print file components of the print job have been removed (cleaned) from downstream devices. Control then transfers to block 90 where the program ends. When the queued print or RIP request is subsequently executed, control would transfer to block 80 to attempt to process the queued print or RIP request if the print job has been removed from the clean-up list. 92, If, at block 82, the print file subject to the print or RIP request is not on a clean-up list, then control transfers to block 86 where the printer manager 6 processes the print job table 20 and status table 22 to determine whether the print file is located on a downstream device. If so, then control transfers to block 96 where the printer manager 6 transmits a command to the downstream device to reuse the downstream copy in the requested print or RIP operation. If multiple downstream devices have copies of the print file, then the printer manager 6 may apply some reuse algorithm to select a downstream device. Methodologies for selecting downstream devices are described in the U.S. patent application entitled "Rule Based Selection Criteria for Controlling Print Job Distribution," assigned Ser. No. 09/140,613, which application was incorporated herein by reference in its entirety above. If a copy of the print file is not maintained in a downstream device, then control transfers to block 92 where the printer manager 6 retrieves the file to print or RIP from the common library storage 10. At block 94, the printer manager 6 transmits the print file to a controller 8a, b, c or printer 12a, b, c, d to print and/or RIP.

With preferred embodiments, any time a print file, which may be an entire print job or a component thereof, is updated, all copies of the outdated print file in the network printing system 2 are systematically deleted from the system. Further, any attempts to process the print job while outdated versions of print files included in the print job are being removed from downstream devices, i.e., cleaned-up, are queued and suspended until all outdated versions are removed.

Conclusion

This concludes the description of the preferred embodiments of the invention. The following describes some alternative embodiments for accomplishing the present invention.

In preferred embodiments, the print file was removed from the downstream devices during the clean-up procedure. However, in alternative embodiments, during clean-up operations, the printer manager 6 may replace outdated versions of the print file with the updated version at the downstream device. In this way, the downstream device maintains a copy of the print file for reuse purposes.

The printer manager 6 and printer controllers 8a, b, c are described as implemented in separate server machines networked together. In alternative embodiments, functions performed by the printer manager 6 may be implemented within one or more printer controllers 8a, b, c. Moreover, each printer controller 8a, b, c, may be capable of implementing more or fewer print daemons than the three print daemons illustrated in the preferred embodiment. In yet further embodiments, the printer manager 6 and printer controllers 8a, b, c may be implemented as software programs within a single server or within the printer unit. There also may be more controllers and printers than the number thereof illustrated in the drawings.

The print job 20 and status 22 tables are described as separate data structures for maintaining information on component print files of print jobs and the location of copies of such print file components in downstream devices. In alternative embodiments, all the information maintained by the print job 20 and status 22 tables may be maintained in a single combined data structure or in any number of separate data structures. Moreover, additional information may be maintained in such data structures in addition to the information described herein. As discussed, the print job 20 and status 22 data structures may be implemented in a database program or as a file type, e.g., a log file.

In preferred embodiments, the clean-up list included print jobs and processed clean-up requests according to the print jobs. In alternative embodiments, the clean-up list may indicate print files to clean-up and the clean-up operation may be performed in an alternative manner to remove outdated copies of a file from downstream devices.

The logic of FIGS. 3a, b and 4 may be implemented as hardware logic or software logic within the operating system of the printer manager or an application program executed by the printer manager. This logic is for illustrative purposes. Additional or alternative steps may be performed in addition to those illustrated in the logic. Further, the order of the steps in the preferred logic may also vary.

Preferred embodiments were described as implemented in a network printing system with respect to "cleaning-up" print files or files that are processed as part of printer related operations. However, the embodiments of the present invention may be applied to "cleaning-up" any type of files in a network system, and not just printer files, where multiple copies and versions of the same file are distributed throughout various network devices. In this way, when a file is updated at a central location, any older versions of the file are removed from or updated at any network device including such outdated version. Moreover, in alternative embodiments, the downstream device is not limited to printer-related devices, and may be comprised of any type of device capable of storing data in an electronic format, e.g., storage devices, computers, etc.

In preferred embodiments, the printer manager 6 would wait before attempting to retry processing a clean-up request for a predetermined "wait" time. In alternative embodiments, the clean-up request may be retried in response to the occurrence of an event. For instance, after determining that a file to clean is unavailable, the printer manager 6 could wait for notification from a device processing the file when the processing or use of the file to clean is finished. Upon receiving such notification, the printer manager 6 could then mark the clean-up request as available and ready to retry. Such embodiments are event-driven models where the clean-up request is retried in response to the occurrence of an external event.

In still further embodiments, each clean-up request could execute as independent, concurrently executing threads. In such case, if the file to clean was unavailable for cleaning, then the particular thread executing the waiting clean-up request would wait for the predetermined time to elapse before retrying the clean-up request. In such case, the clean-up requests would execute and complete independently of the execution of other clean-up threads. In this embodiment, there is no need for a loop, such as the loop described with respect to FIG. 3b, as each clean-up request would spawn as an independent thread.

In preferred embodiments, a clean-up request is queued and retried later if the file to clean-up, i.e., remove, is currently being RIPped or printed. In alternative embodiments, the printer manager 6 may halt any ongoing operation and then delete and reexecute the halted operation after deleting the outdated version of the print file Multiple instances of the logic of FIGS. 3 and 4 may be concurrently executed. In this way, the printer manager may concurrently clean multiple print files.

In non-printing environments, files may be hierarchically arranged such that a plurality of component files are associated with a single object file. In such case, the status table would indicate the component files of the object files and the status data structure would indicate the network devices that include a copy of the component file on an object-by-object basis. For instance, the status table of FIG. 2b would indicate by objects the network devices associated with each component file of an object, where the component files are indicated in the fields of an object file record.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

In summary, preferred embodiments disclose a system and method for managing files in a network system. A processing unit detects an update to a file maintained in a storage unit. At least one network device maintains a copy of the file to update that is a previous version of the file to update maintained at the storage unit. The processing unit processes a data structure indicating network devices that include previous versions of the file and determines the network devices that include at least one previous version of the file. The processing unit then transmits a message to the network devices that include at least one previous version of the file to delete the previous versions of the file.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing files in a network system, comprising:
   detecting an update to a file maintained in a storage unit, wherein at least one network device maintains a copy of the file to update that is a previous version of the file to update maintained at the storage unit;
   in response to detecting the update to the file in the storage unit, performing:
      (i) processing a data structure indicating network devices that include previous versions of the file;
      (ii) determining, from processing the data structure, the network devices that include at least one previous version of the file; and
      (iii) transmitting a message to the network devices that include at least one previous version of the file wherein the message to modify the previous version of the file comprises a request to delete the previous version of the file, wherein after the deletion, tie previous version of the file is not available at the network devices receiving the message.

2. The method of claim 1, wherein after determining the network devices that include previous versions of the file, further performing the steps of:
   determining whether the previous version is being processed at the network device, wherein the step of transmitting the message to the network device to delete the previous version occurs after determining that the previous version is not being processed at the network device; and
   queuing a request to transmit the message to the network device including the previous version after determining that the previous version is being processed at the network device.

3. The method of claim 1, further comprising the steps of:
   receiving a message from the network device indicating that the previous version of the file has been deleted; and
   updating the data structure to indicate the deletion of the file maintained at the network device providing the message indicating that the previous version of the file has been deleted.

4. The method of claim 1, further comprising the steps of:

receiving a request to process the file after an update to the file has been detected;

determining whether the previous version of the file subject to the process request is maintained on at least one of the network devices;

retrieving the file to process from the storage unit after determining that the previous version is not maintained on at least one of the network devices; and queuing the request to process the file after determining that the previous version is maintained on at least one of the network devices.

5. The method of claim 1, wherein the file to update is a component of an object file associated with at least one component file, wherein the data structure indicating network devices that include previous versions of the file is a first data structure, wherein the step of determining network devices that include the previous version comprises the step of processing a second data structure indicating object files and the component files of the object files to determine object files including the previous version, wherein the step of determining the network devices that include the previous version is determined for each determined object file.

6. The method of claim 1, further comprising the steps of:

querying the determined network devices that include the previous version to determine the status of the previous version at the determined network devices; and updating the data structure to indicate the determined status of the previous version at the determined network devices.

7. The method of claim 6, wherein the step of determining the status of the previous version comprises determining whether the previous version is maintained at the network devices and whether the previous version is unavailable at the network device, wherein the step of updating the data structure comprises indicating whether the previous version is maintained at the network device and available.

8. The method of claim 2, wherein the data structure indicating network devices that include the previous version is a first data structure, further comprising the steps of:

generating a second data structure including instances of the previous version at network devices; and removing an instance of the previous version from the second data structure after determining that the previous version of the file was deleted at the network device.

9. The method of claim 8, further comprising the steps of:

receiving a request to perform an operation on the file after an update to the file was detected;

processing the second data structure to determine whether the previous version of the file subject to the request is maintained on at least one of the network devices;

retrieving the file subject to the request from the storage unit after determining that the previous version is not maintained on the network devices; and queuing the request to perform the operation on the file after determining that the previous version is maintained on the network devices.

10. The method of claim 1, wherein the file to update is a print file, and wherein the network devices include at least one printer controller to process the print file and at least one printer to print the processed print file.

11. The method of claim 10, wherein the print file is a component of a print job, wherein the data structure indicating network devices that include previous versions of the print file is a first data structure indicating network devices that include print files for particular print jobs, wherein the step of determining network devices that include the previous version comprises the step of processing a second data structure indicating print jobs and the component print files of the print jobs to determine print jobs including the previous version of the print file, wherein the step of determining the network devices that include previous versions of the print file is determined by processing the first data structure to determine for each print job including the previous version of the file the network device that includes such previous version.

12. The method of claim 10, further comprising the steps of:

querying the determined network devices that include the previous versions of the print file to determine whether the previous version of the print file is maintained at the network devices and whether the network devices are performing an operation that is a member of the set of operations comprising printing the print file and processing the print file; and updating the data structure to indicate whether the previous version is maintained at the network device and whether the network devices are performing an operation that is a member of the set of operations comprising printing the print file and processing the print file.

13. The method of claim 10, wherein the data structure indicating network devices that include previous versions of the print files is a first data structure, further comprising the steps of:

generating a second data structure including instances of the previous version of the print file at network devices; and removing an instance of the previous version from the second data structure after determining that the previous version of the print file was deleted at the network device;

receiving a request to perform an operation on the print file after an update to the print file has been detected;

processing the second data structure to determine whether the previous version of the file subject to the process request is maintained on at least one of the network devices;

retrieving the print file to process from the storage unit after determining that the previous version is not maintained on the network devices; and queuing the request to perform the operation on the print file after determining that the previous version is maintained on the network devices.

14. A system for managing files in a network system and for communicating with network devices via a network communication line, comprising:

a processing unit;

a storage unit accessible to the processing unit, wherein the storage unit stores a file; a memory area accessible to the processing unit including a data structure indicating the network devices that include a version of the file;

program logic executed by the processing unit, comprising:

(i) means for detecting an update to a file maintained in a storage unit;

(ii) means for processing the data structure to determine the network devices that include at least one previous version of the file in response to detecting the update to the file in the storage unit; and (iii) means for transmitting a message to the network devices that include at least one previous version of the file to delete the previous version of the file, wherein after the deletion, the previous version of the file is not available at the network devices receiving the message.

15. The system of claim 14, wherein the program logic further comprises:

means for determining whether the previous version of the file is being processed at the network device, wherein the message is not transmitted to the network device to delete the previous version until the determination is made that the previous version is not being processed at the network device; and means for queuing a request to transmit the message to the network device including the previous version after determining that the previous version is being processed at the network device.

16. The system of claim 14, wherein the program logic further comprises:

means for receiving a message from the network device indicating that the previous version of the file has been deleted; and means for updating the data structure to indicate the deletion of the file maintained at the network device providing the message indicating that the previous version of the file has been deleted.

17. The system of claim 14, wherein the program logic further comprises:

means for receiving a request to process the file after an update to the file has been detected;

means for determining whether the previous version of the file subject to the process request is maintained on at least one of the network devices;

means for retrieving the file to process from the storage unit after determining that the previous version is not maintained on at least one of the network devices; and means for queuing the request to process the file after determining that the previous version is maintained on at least one of the network devices.

18. The system of claim 14, wherein the file to update is a component of an object file associated with at least one component file, wherein the data structure indicating network devices that include previous versions of the file is a first data structure, wherein the memory area further includes a second data structure indicating object files and the component files of the object files, wherein the step of determining network devices that include the previous version comprises the step of processing the second data structure to determine object files including the previous version, wherein the step of determining the network devices that include the previous version is determined for each determined object file.

19. The system of claim 14, wherein the program logic further comprises:

means for querying the determined network devices that include the previous version to determine the status of the previous version at the determined network devices; and means for updating the data structure to indicate the determined status of the previous version at the determined network devices.

20. The system of claim 19, wherein the means for determining the status of the previous version comprises determining whether the previous version is maintained at the network devices and whether the previous version is unavailable at the network device, and wherein the means for updating the data structure comprises indicating whether the previous version is maintained at the network device and available.

21. The system of claim 14, wherein the data structure indicating network devices that include the previous version is a first data structure, and wherein the program logic further comprises:

means for generating a second data structure including instances of the previous version at network devices; and means for removing an instance of the previous version from the second data structure after determining that the previous version of the print file was deleted at the network device.

22. The system of claim 21, wherein the program logic further comprises:

means for receiving a request to perform an operation on the file after an update to the file was detected;

means for processing the second data structure to determine whether the previous version of the file subject to the request is maintained on at least one of the network devices;

means for retrieving the file subject to the request from the storage unit after determining that the previous version is not maintained on the network devices; and means for queuing the request to perform the operation on the file after determining that the previous version is maintained on the network devices.

23. The system of claim 14, wherein the file to update is a print file, and wherein the network devices include at least one printer controller to process the print file and at least one printer to print the processed print file.

24. An article of manufacture for use in programming a computer to manage files in a network system, the article of manufacture comprising computer readable storage media including at least one computer program embedded therein that causes the computer to perform:

detecting an update to a file maintained in a storage unit, wherein at least one network device maintains a copy of the file to update that is a previous version of the file to update maintained at the storage unit;

in response to detecting the update to the file in the storage unit, performing:
(i) processing a data structure indicating network devices that include previous versions of the file;
(ii) determining, from processing the data structure, the network devices that include at least one previous version of the file; and
(iii) transmitting a message to the network devices that include at least one previous version of the file to delete the previous version of the file, wherein after the deletion, the previous version of the file is not available at the network devices receiving the message.

25. The article of manufacture of claim 24, wherein after determining the network devices that include previous versions of the file, further performing the steps of:

determining whether the previous version is being processed at the network device, wherein the step of transmitting the message to the network device to delete the previous version occurs after determining that the previous version is not being processed at the network device; and queuing a request to transmit the message to the network device including the previous version after determining that the previous version is being processed at the network device.

26. The article of manufacture of claim 24, further comprising the steps of:
   receiving a message from the network device indicating that the previous version of the file has been deleted; and
   updating the data structure to indicate the deletion of the file maintained at the network device providing the message indicating that the previous version of the file has been deleted.

27. The article of manufacture of claim 24, further comprising the steps of:
   receiving a request to process the file after an update to the file has been detected;
   determining whether the previous version of the file subject to the process request is maintained on at least one of the network devices;
   retrieving the file to process from the storage unit after determining that the previous version is not maintained on at least one of the network devices; and
   queuing the request to process the file after determining that the previous version is maintained on at least one of the network devices.

28. The article of manufacture of claim 24, wherein the file to update is a component of an object file associated with at least one component file, wherein the data structure indicating network devices that include previous versions of the file is a first data structure, wherein the step of determining network devices that include the previous version comprises the step of processing a second data structure indicating object files and the component files of the object files to determine object files including the previous version, wherein the step of determining the network devices that include the previous version is determined for each determined object file.

29. The article of manufacture of claim 24, further comprising the steps of:
   querying the determined network devices that include the previous version to determine the status of the previous version at the determined network devices; and
   updating the data structure to indicate the determined status of the previous version at the determined network devices.

30. The article of manufacture of claim 29, wherein the step of determining the status of the previous version comprises determining whether the previous version is maintained at the network devices and whether the previous version is unavailable at the network device, wherein the step of updating the data structure comprises indicating whether the previous version is maintained at the network device and available.

31. The article of manufacture of claim 24, wherein the data structure indicating network devices that include the previous version is a first data structure, further comprising the steps of:
   generating a second data structure including instances of the previous version at network devices; and
   removing an instance of the previous version from the second data structure after determining that the previous version of the print file was deleted at the network device.

32. The article of manufacture of claim 31, further comprising the steps of:
   receiving a request to perform an operation on the file after an update to the file was detected;
   processing the second data structure to determine whether the previous version of the file subject to the request is maintained on at least one of the network devices;
   retrieving the file subject to the request from the storage unit after determining that the previous version is not maintained on the network devices; and
   queuing the request to perform the operation on the file after determining that the previous version is maintained on the network devices.

33. The article of manufacture of claim 24, wherein the file to update is a print file, and wherein the network devices include at least one printer controller to process the print file and at least one printer to print the processed print file.

34. The article of manufacture of claim 33, wherein the print file is a component of a print job, wherein the data structure indicating network devices that include previous versions of the print file is a first data structure indicating network devices that include print files for particular print jobs, wherein the step of determining network devices that include the previous version comprises the step of processing a second data structure indicating print jobs and the component print files of the print jobs to determine print jobs including the previous version of the print file, wherein the step of determining the network devices that include previous versions of the print file is determined by processing the first data structure to determine for each print job including the previous version of the file the network device that includes such previous version.

35. The article of manufacture of claim 33, further comprising the steps of:
   querying the determined network devices that include the previous versions of the print file to determine whether the previous version of the print file is maintained at the network devices and whether the network devices are performing an operation that is a member of the set of operations comprising printing the print file and processing the print file; and
   updating the data structure to indicate whether the previous version is maintained at the network device and whether the network devices are performing an operation that is a member of the set of operations comprising printing the print file and processing the print file.

36. The article of manufacture of claim 33, wherein the data structure indicating network devices that include previous versions of the print files is a first data structure, further comprising the steps of:
   generating a second data structure including instances of the previous version of the print file at network devices; and
   removing an instance of the previous version from the second data structure after determining that the previous version of the print file was deleted at the network device;
   receiving a request to perform an operation on the print file after an update to the print file has been detected;
   processing the second data structure to determine whether the previous version of the file subject to the process request is maintained on at least one of the network devices;
   retrieving the print file to process from the storage unit after determining that the previous version is not maintained on the network devices; and
   queuing the request to perform the operation on the print file after determining that the previous version is maintained on the network devices.

* * * * *